UNITED STATES PATENT OFFICE.

HARRY P. BASSETT, OF CATONSVILLE, MARYLAND, ASSIGNOR TO THE SPAR CHEMICAL COMPANY, OF BALTIMORE, MARYLAND, A CORPORATION OF MARYLAND.

PROCESS OF RECOVERING POTASH FROM POTASSIUM-IRON SILICATES.

1,159,464.  Specification of Letters Patent.  Patented Nov. 9, 1915.

No Drawing.  Application filed February 19, 1914.  Serial No. 819,778.

*To all whom it may concern:*

Be it known that I, HARRY P. BASSETT, a citizen of the United States, residing at Catonsville, in the county of Baltimore and State of Maryland, have invented certain new and useful Improvements in Processes of Recovering Potash from Potassium-Iron Silicates, of which the following is a specification.

This invention relates to the treatment of naturally occurring potassium iron silicates which contain potassium in an insoluble form and has particular reference to a process of recovering potash from green sand marl and particularly from green sand marl consisting wholly or principally of glauconite.

Feldspathic rock containing potassium in the form of potassium aluminum silicate, can be decomposed and the potassium transformed into water soluble form by heating with sodium acid sulfate and sodium chlorid or sodium acid sulfate, sodium chlorid and a reducing agent such as carbon. The conversion of the potassium in potassium aluminum silicates in the manner referred to has been considered to be dependent upon the presence of aluminum in the potassium aluminum silicates and such processes have been generally considered to be unadapted to the treatment of potassium iron compounds such as glauconite containing little or no aluminum. In fact the operation of reagents upon potassium iron silicates and potassium aluminum silicates differs so radically that the J. Lawrence Smith method and other commonly employed methods of determining potash in feldspar and similar potassium aluminum silicates are not applicable to determine the potassium content of potassium iron silicates.

Now I have discovered that, contrary to the well established view of chemists familiar with the art, the potassium content of green sand marl and particularly green sand marl consisting principally or substantially wholly of glauconite, can be transformed into water soluble form by heating such material to a reacting temperature with sodium acid sulfate and sodium chlorid, the reaction being preferably carried out in the presence of a reducing agent. Where the reducing agent is used it is employed in such quantity as to reduce only a part of the sulfate present.

In the practice of my process the green sand marl in a preferably dry condition, is mixed with sodium acid sulfate and sodium chlorid in the following preferred proportions by weight: green sand marl, 5 parts, sodium acid sulfate, 5 parts, sodium chlorid, 1.8 parts. The material is heated to a dull red heat preferably in the presence of a reducing agent, the reducing agent when used being employed in sufficient quantity to reduce only a part of the sulfate. The reducing agent may be carbon in the form of coke, added to the original mixture in the proportions of one to three parts of coke to forty parts of the green sand marl. Instead of mixing the reducing agent with the green sand marl the heating may be conducted in a reducing flame, the process being practised under the most favorable conditions by heating the green sand marl, sodium acid sulfate and sodium chlorid in the presence of sufficient reducing agent to reduce a part only of the sulfate present to a sulfid.

In my investigations of green sand marl from the principal deposits in New Jersey and in Delaware and Maryland I have found that variable amounts of iron oxids, clay and silt in a very fine condition and lighter than the material itself, are associated with the glauconite. I have also found that there are associated with the glauconite in the sand relatively large particles which are ordinarily crystalline and consist for the most part of quartz and contain little or no potassium. These larger particles may be removed by passing the sand through a twenty or forty mesh sieve, preferably a twenty mesh sieve.

I have found that, in the practice of my process, I can increase the percentage of potassium iron silicates in the sand by washing or floating away the fine and light particles of iron oxids, silt and clay and that the percentage of such silicates may be still further increased by screening out the relatively large particles containing little or no potassium.

In the preferred practice of my process, after washing or floating away the fine or light particles and screening out the relatively large particles, the material is preferably dried by artificial heat, mixed with sodium acid sulfate, sodium chlorid and coke as hereinabove set forth and heated to a reacting temperature, preferably to a temperature of about 900° F. The heating is preferably continued for from 20 to 40 minutes if a reducing agent is employed or from one to three hours if not employed, after which the material is allowed to cool and is leached with water or the mass while hot, may be dumped directly into water. The water dissolves the sodium and potassium salts, the latter being present in the form of potassium sulfate. The sodium and potassium salts are then separated, preferably by crystallization.

While I have described in detail the preferred practice of my process it is to be understood that the reaction temperature, the proportions of reagents and the details of procedure may be varied without departure from the spirit of my invention or the scope of the appended claims.

Having described my invention, I claim:—

1. The process of treating green sand marl consisting principally of glauconite which consists in heating a mixture thereof with sodium acid sulfate and sodium chlorid to a reacting temperature in the presence of a reducing agent, the reducing agent being employed in such quantity as to reduce only a portion of the sulfate present and separating the water soluble portion of the resulting mixture from the remaining portion.

2. The process of treating potassium iron silicates containing potassium in an insoluble form, which consists in heating a mixture thereof with sodium acid sulfate, sodium chlorid and a reducing agent to a reacting temperature, the reducing agent being employed in such quantity as to reduce only a portion of the sulfate present and separating the water soluble portion of the resulting mixture to the remaining portion.

3. The process of treating green sand marl which consists in washing out and thereby removing the finer and lighter particles thereof, screening out and thereby removing the larger particles which consist principally of quartz, drying the resulting concentrates, mixing sodium acid sulfate and sodium chlorid therewith, heating the mixture to a dull red heat in the presence of a reducing agent, the reducing agent being employed in such quantity as to reduce only a portion of the sulfate present to sulfid, and separating the water soluble portion of the resulting mass from the remaining portion.

In testimony whereof I affix my signature in presence of two witnesses.

HARRY P. BASSETT.

Witnesses:
C. L. PARKER,
JAMES L. CRAWFORD.